Feb. 26, 1957  J. F. KROENER ET AL  2,782,536
CONVEYOR PRESSING AND IRONING APPARATUS
Filed Sept. 4, 1953  6 Sheets-Sheet 1
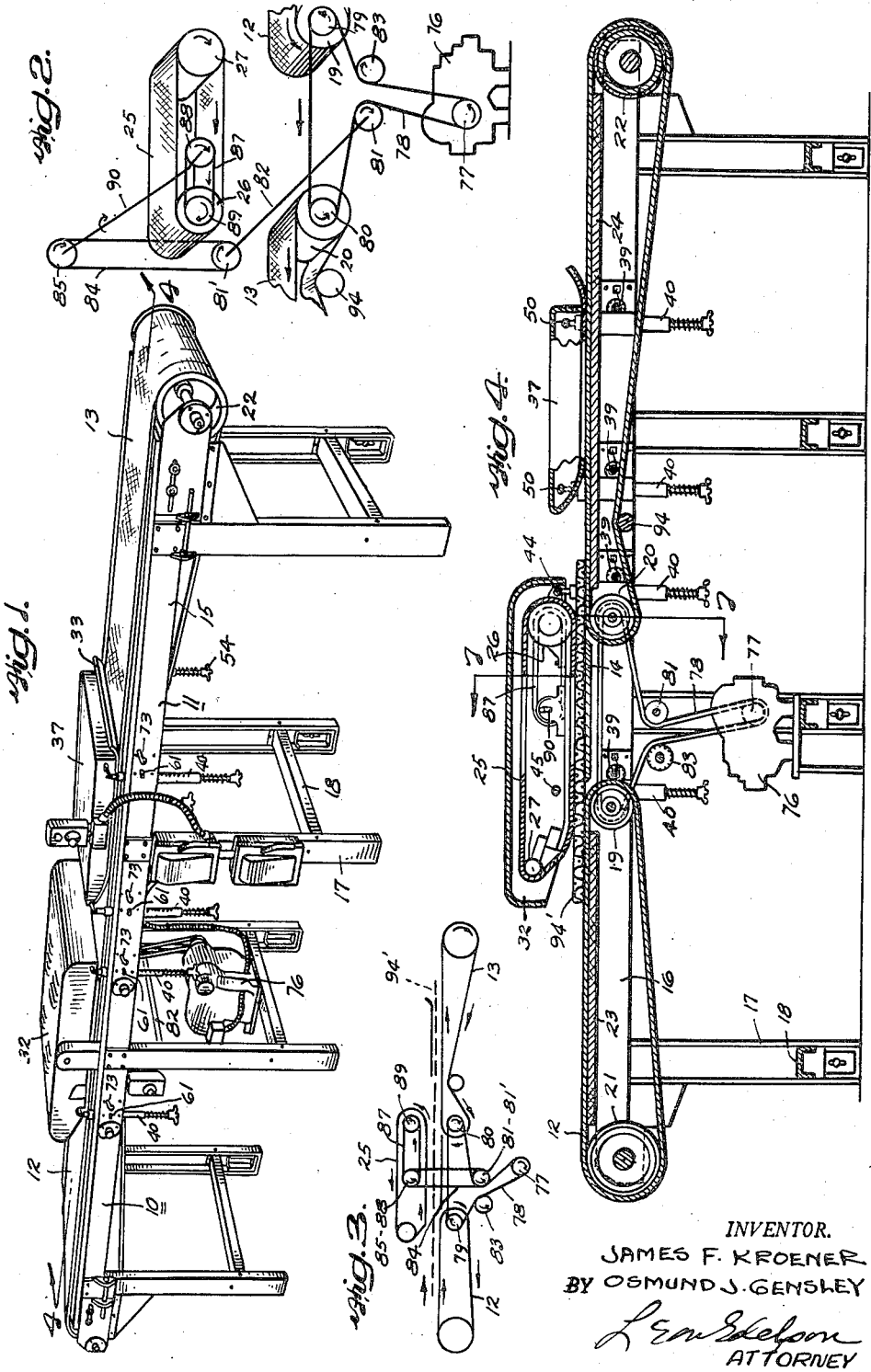
INVENTOR.
JAMES F. KROENER
BY OSMUND J. GENSLEY
ATTORNEY

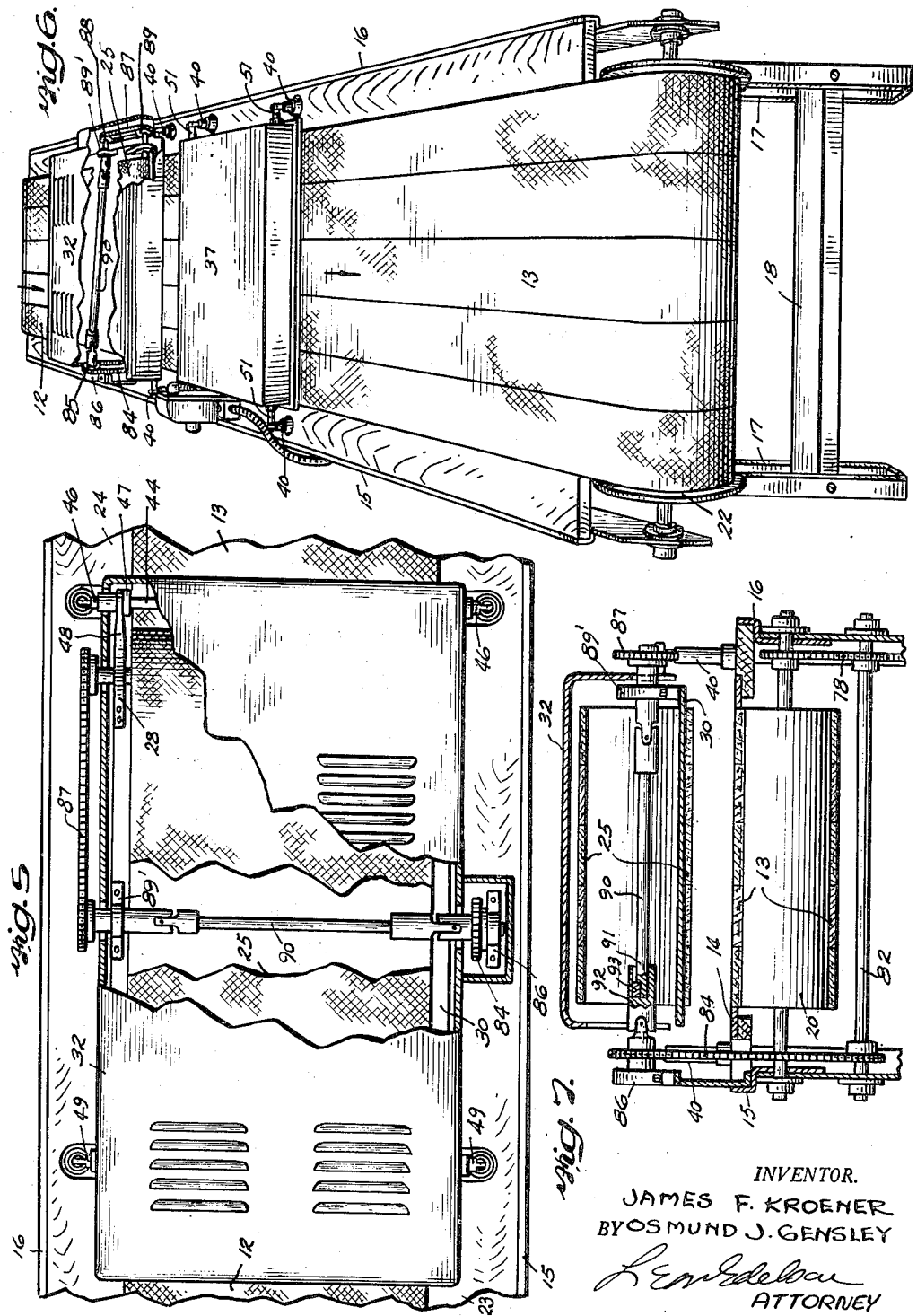

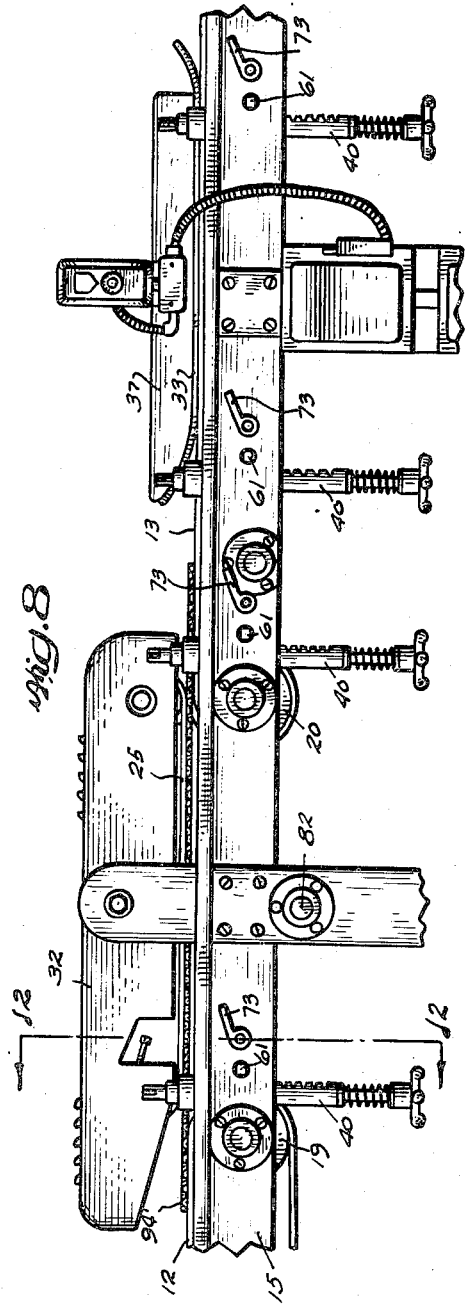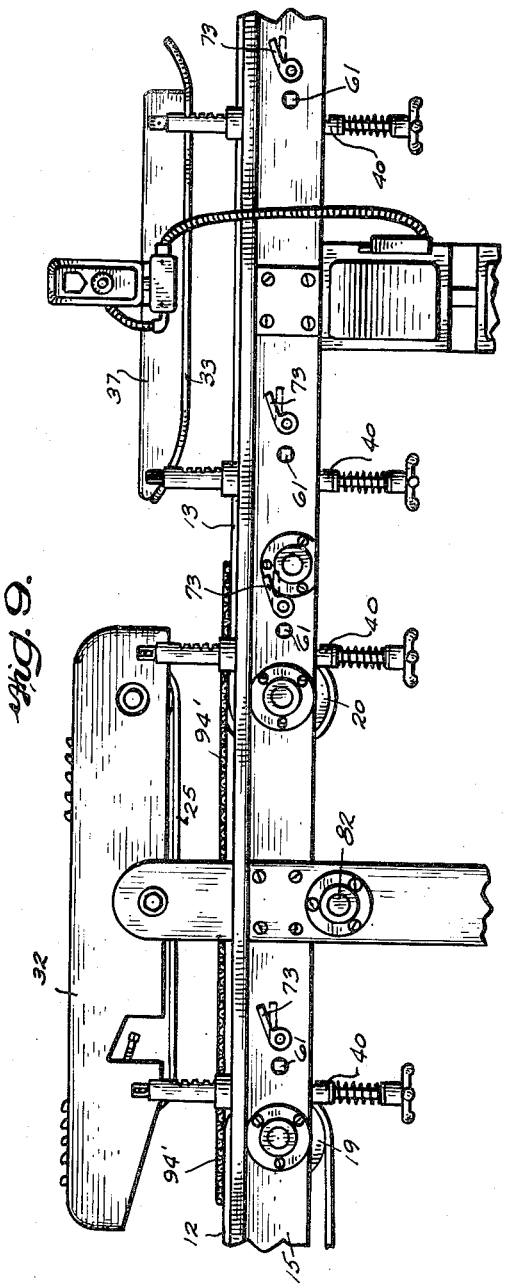

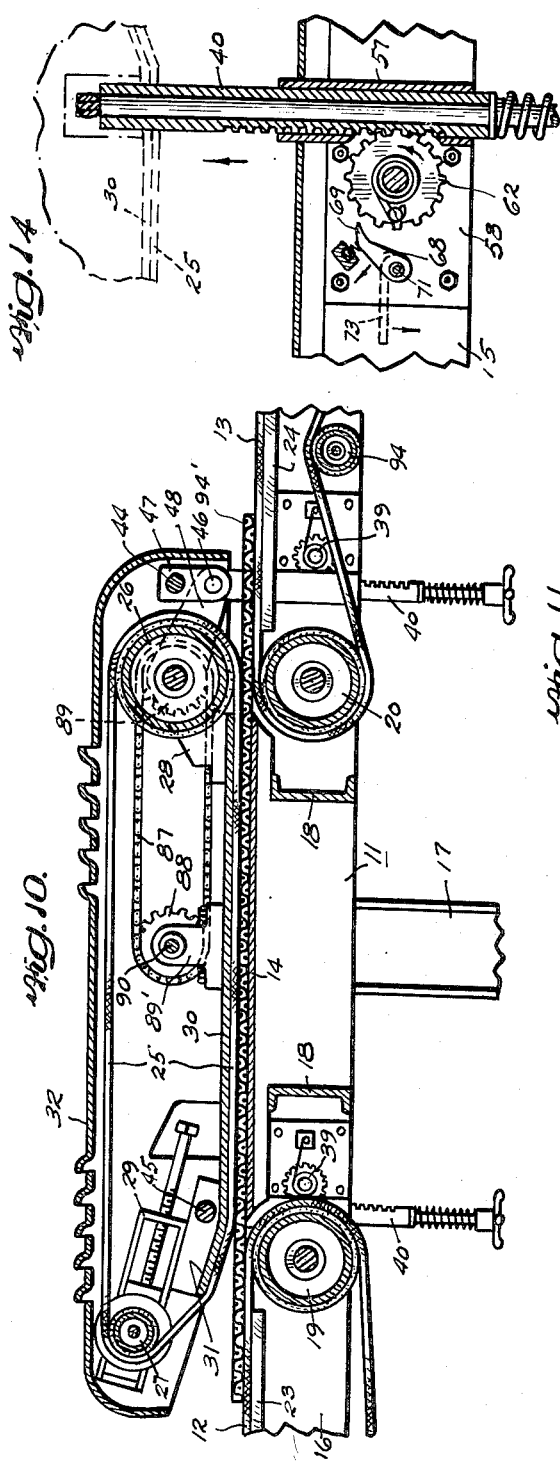
INVENTOR.
JAMES F. KROENER
BY OSMUND J. GENSLEY

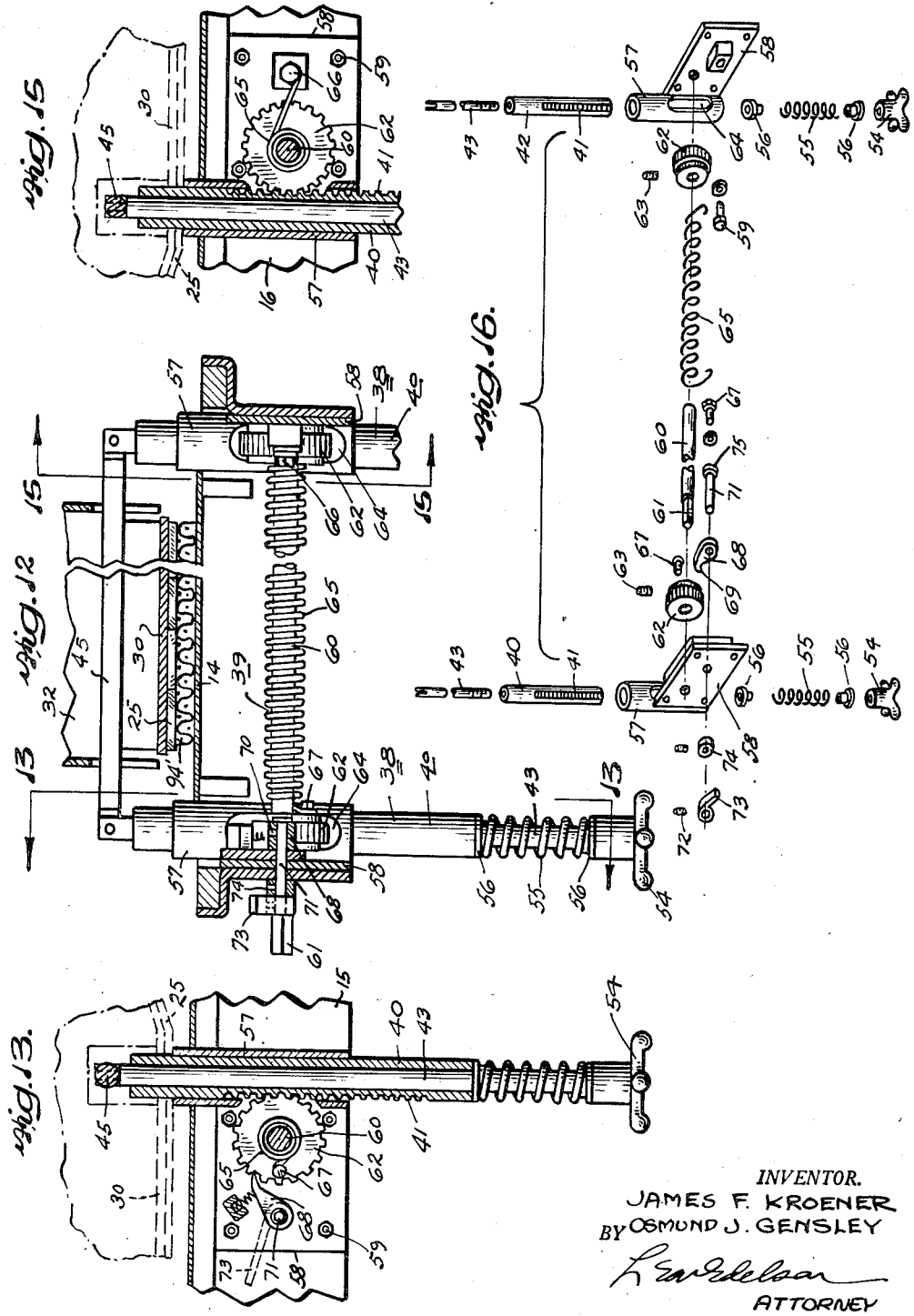

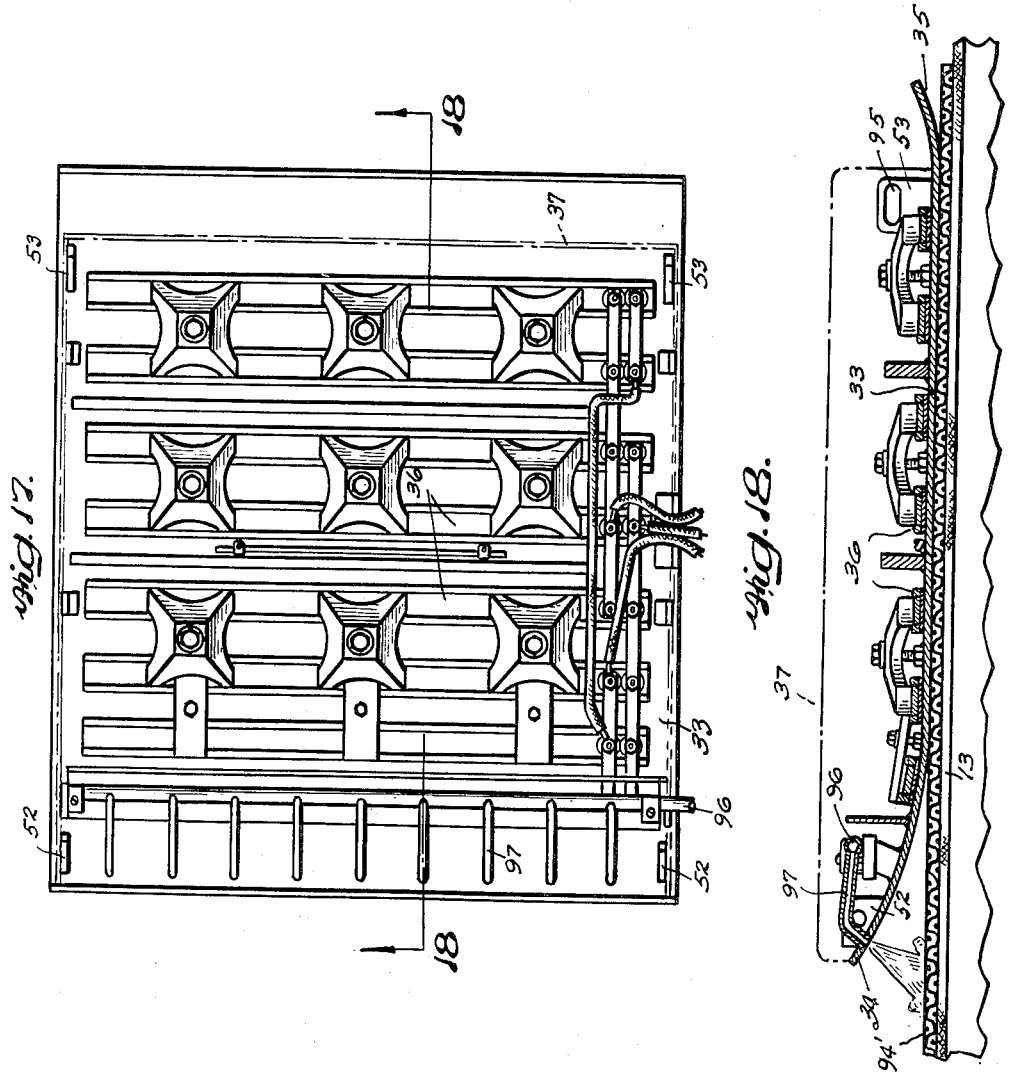

United States Patent Office 2,782,536
Patented Feb. 26, 1957

2,782,536

CONVEYOR PRESSING AND IRONING APPARATUS

James F. Kroener and Osmund J. Gensley, Reading, Pa., assignors to American Safety Table Company, Inc., Reading, Pa., a corporation of Pennsylvania Application September 4, 1953, Serial No. 378,462

8 Claims. (Cl. 38—11)

This invention relates generally to apparatus for treating folded garments and is more particularly concerned with a machine for pressing and ironing the same to give them a more appealing appearance and to facilitate packaging.

A principal object of the present invention is to provide an improved arrangement for driving a pressing and ironing machine which comprises a series of conveyor sections successively engaging the work and continuously moving it along at a constant rate of speed.

Another object of this invention is to provide the aforementioned conveyor sections each with a pulley driven conveyor belt and to operatively connect together the several driving pulleys in a positive manner in order to facilitate synchronizing the movement of their belts.

Still another object of the present invention is to provide an improved arrangement for mounting the units of such a machine which are adjustable depending upon the thickness of the work to be handled and the pressure to be exerted thereon.

And still another object of the present invention is to provide for the adjustment of the aforementioned units through the medium of a rack and pinion spring loaded assembly which may be quickly released for maximum separation of the aforementioned units from the work and which may then be conveniently manually actuated to reduce the separation any desired amount.

A further object of this invention is to provide such a machine with means for preliminarily treating the work to facilitate the ironing thereof.

Other objects and advantages of the present invention will appear more fully hereinafter, it being understood that said invention consists substantially in the combination, construction, location and general arrangement of parts, all as described in detail in the following specification, as shown in the accompanying drawings and as fully pointed out in the appended claims.

In the accompanying drawings:

Figure 1 is perspective view of a pressing and ironing machine embodying the present invention, looking at the right side and the rear thereof;

Figure 2 is a diagrammatic perspective view of the drive means for the machine of Figure 1, looking at the left side and from the rear thereof;

Figure 3 is a diagrammatic view showing the drive means for the machine, looking at the right side thereof;

Figure 4 is a section taken on the line 4—4 of Figure 1;

Figure 5 is a plan view of the bottom press conveyor unit, parts being broken away to expose others;

Figure 6 is a perspective view of the machine looking at the top and rear thereof, the cover for the bottom press conveyor unit being omitted for the sake of clarity;

Figure 7 is an enlarged section on the line 7—7 of Figure 4, the bottom press conveyor unit being shown in raised position and the work being omitted;

Figure 8 is a side elevational view of a part of the machine looking at the right side thereof, a garment being shown passing over the bottom ironing shoe and being pressed thereagainst by the bottom press conveyor unit, and the top ironing unit being shown in its lowermost position in contact with the underlying conveyor belt;

Figure 9 is the same as Figure 8 but shows the bottom press conveyor unit and the top ironing unit in raised positions;

Figure 10 is a vertical longitudinal section through the bottom press conveyor unit showing a garment passing over the bottom ironing shoe and being pressed thereagainst by the bottom press conveyor unit;

Figure 11 is a perspective view of the bottom press conveyor unit looking at the right side and from the rear thereof, the cover therefor being omitted to expose the parts thereunder;

Figure 12 is an enlarged section taken on line 12—12 of Figure 8;

Figure 13 is a section taken on line 13—13 of Figure 12;

Figure 14 is the same as Figure 13 but shows the bottom press unit in raised position;

Figure 15 is a section taken on line 15—15 of Figure 12;

Figure 16 is an exploded perspective view of the rack and pinion assembly;

Figure 17 is a plan view of the top ironing unit, the cover therefor being removed to expose the parts thereunder; and Figure 18 is an enlarged section on the line 18—18 of Figure 17.

Referring to the drawings, and particularly to Figures 1 and 4 thereof, the pressing and ironing machine of the present invention is provided with a base structure 10 including a rigid floor supported frame 11, conveyor belts 12 and 13 respectively at the front and rear ends thereof, and a bottom ironing shoe 14 intermediate the conveyor belts 12 and 13.

The frame 11 is provided with a pair of side rails 15 and 16, legs 17 and suitable cross members 18 all rigidly secured together to form an open horizontally extending top part supported at a convenient height from the floor.

The conveyor belts 12 and 13 are provided respectively with drive pulleys 19 and 20 and respectively with take-up pulleys 21 and 22, the opposite end portions of each pulley being journaled respectively in the side rails 15 and 16. The drive pulleys 19 and 20 are disposed in proximate spaced relation intermediate the opposite ends of the frame 11, the take-up pulleys 21 and 22 being disposed respectively at the front and rear of the machine. The bottom ironing shoe 14 spans the space between the drive pulleys 19 and 20 and the opposite end portions thereof respectively are set back from the aforementioned pulleys to permit movement of the conveyor belts 12 and 13. In addition, the shoe 14 extends between the side rails 15 and 16, and its opposite side portions respectively are rigidly secured thereto. The upper runs of the conveyor belts 12 and 13 are supported respectively on a pair of members 23 and 24 carried by side rails 15 and 16, and the upper surfaces of these upper runs and of the bottom ironing shoe 14 are disposed in coplanar relation to form an upwardly presenting work supporting surface.

Directly over the bottom ironing shoe 14 there is mounted a coacting unit comprising a conveyor belt 25 provided with a drive pulley 26 and a take-up pulley 27 disposed respectively proximate the drive pulleys 20 and 19. The pulleys 26 and 27 are journaled respectively in sets of bearings 28—28 and 29—29 rigidly secured to a broad plate 30 turned upwardly proximate the take-up pulley 27 as at 31. For protecting workers from its moving parts this bottom press conveyor unit is provided with a cover 32.

Directly over the conveyor belt 13 there is mounted a coacting unit provided with top ironing shoe 33 having opposite end portions turned up as at 34 and 35, electric heating elements 36, and a cover 37.

For mounting the aforementioned units on the base structure there is provided at each end of each unit a pair of laterally spaced rack and pinion assemblies each including a rack subassembly 38 and a coacting pinion subassembly 39. It will be noted that each unit is thus provided with four rack and pinion assemblies respectively located at the fore and aft ends of each opposite side of the unit. Each rack subassembly 38 includes a vertically extending tubular rack member 40 adapted for axial shifting movement, the teeth 41 of the rack member being formed along one side of the latter. Slidably extending through each tubular rack member is a vertical bar 43, the upper end of which is bifurcated and is pivotally secured to one end portion of an associated cross bar which extends across the machine and serves to interconnect the paired rack and pinion assemblies for conjoint operation thereof.

The cross bars associated respectively with the opposite end portions of the bottom press conveyor belt 25 are designated respectively by the numerals 44 and 45. The cross bar 44 is provided with opposite end portions 46—46 similarly offset by a pair of elements 47—47 and projected respectively through a pair of arms 48—48 which form integral extensions of the bearings 28—28 and which are disposed in outer side-abutting relation to the elements 47—47 for restraining lateral shifting movement of the bottom press conveyor unit. The cross bar 45 is a straight bar the opposite end portions 49—49 of which are projected respectively through the take-up bearings 29—29.

The cross bars associated with opposite end portions of the top ironing shoe 37 are designated each by the numeral 50, the opposite end portions 51—51 of the forward cross bar 50 being projected through a pair of plates 52—52 (see Figures 17 and 18) respectively disposed on opposite sides of the top ironing shoe 33, and the opposite end portions 51—51 of the rear cross bar 50 being projected through a pair of plates 53—53 respectively disposed on opposite sides of the top ironing shoe 33.

The lower end portion of each bar 43 has threaded thereon a handwheel 54 disposed in lower spaced relation to the tubular rack member 40, while intermediate the handwheel 54 and the tubular rack member 40 are a coil compression spring 55 and a pair of spring seat washers 56—56, the spring 55 being operative to bias the tubular rack member into engagement with its associated cross bar. The tubular rack member 40 is slidably received in and is guided by a tubular bracket sleeve 57 which is rigidly secured to the associated side rail of the frame 11 by a bracket plate member 58 to one end portion of which it is welded, the bracket plate 58 being in turn secured in place by a set of bolts 59 projected through the bracket plate 58 and the side rail.

Each pair of the laterally spaced pinion subassemblies 39—39 are interconnected by a shaft 60 which extends across the frame 11 between the side rails 15 and 16. The opposite end portions of the shaft 60 are journaled in the bracket plates 58—58 one terminal portion 61 of the shaft 60 being squared and projected through the side rail 15 for engagement with a crank (not shown).

The transversely extending shaft 60 carries a pair of pinions 62—62 each secured thereto by a set screw 63 and disposed for engagement with the teeth 41 formed on the tubular rack member 40, the teeth 41 being exposed for such engagement by way of a slot 64 formed in the tubular bracket sleeve 57. Embracing the shaft 60 is a coil spring 65, one end portion of which is anchored, as at 66, to the bracket plate 58 on one side of the machine, its opposite end portion being anchored, as at 67, to the pinion 62 on the other side of the machine. Associated with the latter pinion 62 is a spring pressed pawl 68, as best shown in Figure 13, which is provided with a detent 69. The pawl is secured, as by a set screw 70, to a pivot shaft 71 which is projected through the bracket plate 58 and the side rail 15, the outer free end of the pivot shaft having fixed thereto, as by a set screw 72, a lever 73 for effecting release of the pawl when desired. To provide against axial displacement of the pivot shaft 71 it is fitted with a collar 74 on the outer face of the side rail 15 and with an enlarged head 75 on its inner end.

For driving the machine there is provided a motor 76 which is furnished with a chain sprocket 77 (Figures 2, 3, 4 and 7). Trained over the latter is a drive chain 78 which also engages a pair of chain sprockets 79 and 80 respectively associated with and arranged for driving the conveyor belt drive pulleys 19 and 20. The drive chain 78 additionally engages another chain sprocket 81 mounted on a countershaft 82, the opposite end portions of the latter being suitably journaled in opposed opposite side portions of a pair of the legs 17—17 of the frame 11. For maintaining the drive chain 78 suitably taut any conventional chain tensioning device 83 may be employed. The drive chain 78 and all the chain sprockets over which it is trained are disposed on the far side of the machine, that is, on the side away from that on which the operator is normally stationed.

On the near side of the machine another drive chain 84 is trained over a chain sprocket 81' fixed on the near end of the countershaft 82 and over a chain sprocket 85 suitably journaled in a bearing 86 carried by the near side rail 15. On the far side of the machine still another drive chain 87 is trained over a chain sprocket 88 and a chain sprocket 89. The chain sprocket 88 is suitably journaled in a bearing 89' carried by the plate 30 on the far side of the machine and is operatively coupled with the chain sprocket 85 on the near side of the machine by means of a transversely extending shaft 90 having universal coupling joints adjacent its opposite ends, one of which coupling joints includes a sleeve 92 (see Figure 7) in which is slidably fitted the end 91 of the shaft 90, the latter being splined to the coupling sleeve, as at 93, for conjoint rotation of the spline and sleeve while permitting axial movement of the shaft relatively to the sleeve. Thus, upon rotation of the shaft 90, and operation thereby of the sprocket 88, the drive chain 87 operates to drive the sprocket 89 and the conveyor belt drive pulley 26 which is operatively associated with the sprocket 88.

In operation of the machine, the motor driven sprocket 77 actuates the drive chain 78 and the sprockets 79, 80 and 81. The sprockets 81 and 81' being mounted on the countershaft 82 for rotation in unison, the sprocket 81' is thus driven and actuates the drive chain 84 and the sprocket 85. The sprockets 85 and 88 being coupled together for rotation in unison, the latter is thus driven and actuates the drive chain 87 and the sprocket 89. The axes of rotation of the sprockets 77, 79, 80, 81 and 81' and 85 are fixed, but the axes of rotation of the sprockets 88 and 89 shift with the vertically adjustable bottom press conveyor unit. It will be observed that nevertheless the pulleys 19, 20 and 26 are operatively interconnected in a positive manner through the drive means just described so that movement of the conveyor belts 12, 13 and 25 may be readily synchronized so that the upper runs of the conveyor belts 12 and 13 and the lower run of the conveyor belt 25 move in the same direction at the same rate of speed. In order to decrease the possibility of slippage between a drive pulley and its conveyor belt, an additional pulley may be conventionally employed as at 94.

The work 94' is introduced to the machine by placing it on a work receiving belt section afforded by the upper run of the conveyor belt 12 which is disposed in the work receiving region of the machine. As the work carried upon the upper run of the conveyor belt 12 approaches the pulley 19, it is engaged by the downwardly presenting surface of the lower run of the conveyor belt 25 and pushed along to and over the bottom ironing shoe 14 to a work delivery belt section afforded by the upper run of the conveyor belt 13. The latter carries the work first under the top ironing shoe 33 in contact with the downwardly presenting surface thereof and then into a delivery region at the rear end of the machine. Of course, suitable controls are provided for starting and stopping the machine.

In order to regulate the pressure to be exerted by the bottom press conveyor unit or the top ironing unit upon the work, the handwheels 54 are threaded more or less on their bars 43 to suitably compress their springs 55. Vertical adjustment of the bottom press conveyor unit or the top ironing unit to accommodate work of a predetermined thickness which is to pass thereunder is effected by suitable actuation of the rack and pinion assemblies by an operator stationed on the near side of the machine without any necessity for passing to the far side thereof. It will be appreciated that the positionally fixed sprocket 85, the positionally shiftable sprocket 88 and the interconnecting shaft 90 with its universal couplings are self adjusting to any vertical movement of the bottom press conveyor unit.

To lower the end of a unit, the shaft 60 of the associated pinion subassembly 39 is cranked so that the pinions 62—62 mounted on the shaft 60 turn in a direction to axially shift their rack subassemblies 38—38 downwardly to any desired position. The pawl 68 will move freely over the teeth of its pinion 62, and simultaneously energy will be stored in the coil spring 65 on the shaft 60. Upon release of the shaft 60, the pawl 68 engages the teeth of its pinion 62 and thus prevents release of the energy stored in the coil spring 65.

When it is desired to raise the end of the unit from its lowered position, first the lever 73 is pressed so that the pin 71 and the pawl 68 turn against the force of the spring associated therewith and so that the detent 69 of the pawl 68 is disengaged from its pinion 62, whereupon the energy stored in the coil spring 65 is released and the pinions 62—62 quickly act to axially shift the rack subassemblies 38—38 upwardly to the limit of their possible movement. Then a crank is applied to the shaft 60 of the pinion subassembly 39 to lower the rack assemblies to the desired position. The relative arrangement of the coacting parts is such that either end of either unit may be raised or lowered independently of the opposite end thereof this by reason of the fact that opposite ends of each unit are each pivotally supported on a cross bar interconnecting a pair of laterally spaced rack and pinion assemblies. It will be observed that the opposite end portions 51—51 of the cross bar 50 at the rear end of the top ironing unit are projected through elongated openings 95—95 in the plates 53—53 to insure freedom of movement as said rear end of the unit is raised and lowered.

As the work passes over the bottom ironing shoe 14, which is heated by suitable electric heating element (not shown), it is pressed thereagainst by the bottom press conveyor unit, being thereby compacted and ironed on its under surface. As the work passes under the top ironing unit, which is heated by the electric heating elements 36, it is further compacted and ironed on its upper surface. The ironing shoe 33 is provided with a manifold 96 which extends across the front end thereof and which is provided with a plurality of laterally extending outlet branches 97 directed upon the work as it approaches the top ironing shoe 33. The manifold 96 is connected by a suitably valved conduit (not shown) to a source of steam which is directed thereby upon the work to preliminarily treat the same to facilitate the pressing thereof as will be understood by those skilled in the art.

It will be understood, of course, that the apparatus as herein shown and described is susceptible of various changes and modifications which may be made from time to time without any departure from the general principles or real spirit of the present invention. Accordingly, it is intended to claim the present invention broadly, as well as specifically, as indicated in the appended claims.

What is claimed as new and useful is:

1. In a pressing and ironing machine, a base structure having a longitudinally extending upwardly presenting work supporting surface, a unit disposed over said base structure and having a longitudinally extending downwardly presenting work engaging surface, and means mounting said unit on said base structure for adjustment of the space between said surfaces, said means comprising a rack and pinion assembly for each end of said unit, each assembly including a vertically extending rack subassembly axially shiftable and mounting the associated end of said unit for vertical swinging movement of the unit, and a pinion subassembly operable from one side of said machine to shift said rack subassembly axially to a desired position, said pinion subassembly including means for releasably locking said rack subassembly in the position selected.

2. In a pressing and ironing machine as defined in claim 1 wherein said means for locking the rack subassembly in the position selected comprises means for storing energy when the pinion subassembly is actuated to shift said rack subassembly downwardly and acting to bias said pinion subassembly in a direction for shifting said rack subassembly upwardly, and a means for securing said pinion subassembly against rotation in said direction, said securing means being quickly disengageable, whereupon said stored energy is released for shifting said rack subassembly upwardly as aforementioned.

3. In a pressing and ironing machine, a base structure having a longitudinally extending upwardly presenting work supporting surface, a unit disposed over said base structure and having a longitudinally extending downwardly presenting work engaging surface, and means mounting said unit on said base structure for adjustment of the space between said surfaces, said means comprising a rack and pinion assembly for each end of said unit, each assembly including a pair of coacting subassemblies the first of said subassemblies being provided with a pair of vertically extending transversely spaced rack members mounted on said base structure for axial shifting movement and having mounted thereon the associated end of said unit for vertical swinging movement of the unit, and the second of said subassemblies being provided with a pair of pinions engaged respectively with said rack members and mounted for rotation together, being operable from one side of said machine for shifting said rack members axially to a desired position, spring means for storing energy when said pinions are actuated to shift said rack members downwardly and acting to bias said pinions in a direction for shifting said rack members upwardly, and means for securing said pinions against rotation in said direction, said securing means being quickly disengageable, whereupon said spring acts to shift said rack members upwardly as aforementioned.

4. In a pressing and ironing machine, a base structure having a longitudinally extending upwardly presenting work supporting surface, a unit disposed over said base structure and having a longitudinally extending downwardly presenting work engaging surface, and means mounting said unit on said base structure for adjustment of the space between said surfaces, said means comprising a rack and pinion assembly for each end of said unit, each assembly including a pair of coacting subassemblies, the first of said subassemblies being provided with a pair of vertically extending transversely spaced rack members mounted on said base structure for axial shifting movement and having mounted thereon the associated end of said unit for vertical swinging movement of the unit, and the second of said subassemblies being provided with a shaft journaled in said base structure and mounting a pair of pinions engaged respectively with said rack members, said shaft and pinions being operable from one side of said machine for shifting said rack members axially to a desired position, a coil spring wrapped about said shaft and adapted to store energy when said pinions are actuated to shift said rack members downwardly and acting to bias said pinions in a direction for shifting said rack members upwardly, and a pawl for securing said pinions against rotation in said direction, said pawl being quickly disengageable, whereupon said spring acts to shift said rack members upwardly as aforementioned.

5. In a pressing and ironing machine, a base structure having a longitudinally extending upwardly presenting work supporting surface, a unit disposed over said base structure and having a longitudinally extending downwardly presenting work engaging surface, and means mounting said unit on said base structure for adjustment of the space between said surfaces, said means comprising a rack and pinion assembly for each end of said unit, each assembly including a pair of coacting subassemblies, the first of said subassemblies being provided with a pair of rack members disposed respectively on opposite sides of said work supporting surface and extending vertically above and below the same, said rack members being mounted on said base structure for axial shifting movement, a transversely extending member connecting said rack members and disposed above said work supporting surface, the associated end of said unit being mounted thereon for vertical swinging movement of said unit, and the second of said subassemblies being provided with a transversely extending shaft journaled in said base structure and disposed below said work supporting surface, said shaft having mounted thereon a pair of pinions engaged respectively with said rack members, said shaft and pinions being operable from one side of said machine for shifting said rack members axially to a desired position, a coil spring wrapped about said shaft and having one end anchored to said base structure and the other end anchored to one of said pinions, said spring being adapted to store energy when said pinions are actuated to shift said rack members downwardly and acting to bias said pinions in a direction for shifting said rack members upwardly, and a pawl mounted on said base structure and engaged with one of said pinions for securing said pinions and their shaft against rotation in said direction, said pawl being quickly disengageable, whereupon said spring acts to shift said rack members upwardly as aforementioned.

6. In a pressing and ironing machine, a base structure having a longitudinally extending upwardly presenting work supporting surface, a unit disposed over said base structure and having a longitudinally extending downwardly presenting work engaging surface, and means mounting said unit on said base structure for adjustment of the space between said surfaces, said means comprising a rack and pinion assembly for each end of said unit, each assembly including a vertically extending rack subassembly axially shiftable and mounting the associated end of said unit for vertical swinging movement of the unit, said rack subassembly comprising relatively axially shiftable parts, and adjustable means for yieldably restraining such shifting, and a pinion subassembly operable from one side of said machine to shift said rack subassembly axially to a desired position, said pinion subassembly including means for releasably locking said rack subassembly in the position selected.

7. In a pressing and ironing machine, a pair of pulley driven conveyor belts having upper runs adapted to travel horizontally in the same plane respectively in work receiving and work delivering regions, a bottom ironing shoe interposed between said upper runs with its smoothing face presenting upwardly substantially in coplanar relation to the upper surfaces of said runs, a vertically adjustable pulley driven conveyor belt having a lower run adapted to travel horizontally and to coact with said shoe and work receiving run to move work from the latter to said work delivery run, a set of chain sprockets revoluble about horizontal axes, means operatively interconnecting said chain sprockets and the several belt driving pulleys for movement of said conveyor belt runs in the same direction at the same surface speed including universal coupling means interconnecting a pair of said sprockets disposed respectively on opposite sides of said machine for simultaneous rotation respectively about a fixed axis and an axis shiftable with said vertically adjustable conveyor belt, and a top ironing shoe disposed above the front end of said work delivery run with its smoothing face presenting downwardly to iron the top face of said work as the latter is moved into said delivery region.

8. In a pressing and ironing machine as defined in claim 7 wherein the universal coupling means is axially extensible.

References Cited in the file of this patent

UNITED STATES PATENTS

| | | |
|---|---|---|
| 234,631 | Vandercar | Nov. 16, 1880 |
| 408,132 | Otte | July 30, 1889 |
| 1,440,862 | Benjamin | Jan. 2, 1923 |
| 1,823,628 | Pietracatella | Sept. 15, 1931 |
| 2,388,392 | Davies | Nov. 6, 1945 |